United States Patent [19]
Gilbertson

[11] 4,456,458
[45] Jun. 26, 1984

[54] AIR INTAKE SYSTEM FOR ENGINE

[75] Inventor: Frederick L. Gilbertson, Rexdale, Canada

[73] Assignee: The De Havilland Aircraft of Canada, Limited, Downsview, Canada

[21] Appl. No.: 420,062

[22] Filed: Sep. 20, 1982

[51] Int. Cl.³ .............................................. B01D 39/00
[52] U.S. Cl. ................................... 55/306; 60/39.092; 244/53 B
[58] Field of Search .......... 55/306; 60/39.092, 39.093; 244/53 B

[56] References Cited
U.S. PATENT DOCUMENTS

| | | | |
|---|---|---|---|
| 2,944,731 | 7/1960 | Kasten | 55/306 |
| 3,952,972 | 4/1976 | Tedstone et al. | 60/39.092 |
| 4,265,646 | 5/1981 | Weinstein et al. | 55/306 |
| 4,346,860 | 8/1982 | Tedstone | 244/53 B |

Primary Examiner—Bernard Nozick
Attorney, Agent, or Firm—Rogers, Bereskin & Parr

[57] ABSTRACT

An intake system for removing particles from air entering an engine, in which the intake air in an intake duct is divided into a primary airstream which flows upwardly at a sharp angle from the intake stream and into the engine inlet, and a secondary airstream which flows directly rearwardly with the particles to be removed, into a plenum where the particles are collected. A third airstream is formed which flows forwardly from the plenum beneath and at the sides of the intake duct, then upwardly around the sides of the intake duct and into the engine inlet.

20 Claims, 17 Drawing Figures

AIR INTAKE SYSTEM FOR ENGINE

This invention relates to an air intake system for separating foreign particles and other objects from air flowing into the inlet of a gaseous power plant such as a gas turbine engine.

The ingestion of foreign particles and objects into gaseous power plants such as gas turbine engines is a long existing problem. Aircraft engines in particular are susceptible to ingesting objects such as birds, hail, sand, stones, pieces of tire and the like. Such objects can damage or destroy such an engine, particularly if it is a small high speed engine.

Numerous attempts have been made to provide structures which prevent foreign particles and objects from entering a power plant such as a gas turbine engine. However such systems have had one or more of a number of disadvantages. These disadvantages have included complexity, a tendency to reduce engine efficiency or power, weight penalties, and decreased accessibility of the engine for service. Examples of some of the many systems which have been conceived are shown in U.S. Pat. Nos. 2,944,731; 3,309,867; 3,329,377; 3,513,641; 3,362,155; 3,952,972 and 4,265,646.

Accordingly, it is an object of the present invention to provide an air intake system which includes improved means for separating particles and other objects from the air entering an engine. To this end the invention provides: for use with an engine having an air inlet, a separator for removing foreign particles from the air entering said inlet, said separator comprising:

(a) an air intake duct formed for an intake airstream to flow in a first substantially rearward path therein, (b) a plenum behind said intake duct, (c) said intake duct having guide means for separating from said intake airstream a primary airstream and for guiding said primary airstream in a second path at a substantial angle to said first path for passage into said engine inlet, (d) said inlet duct being oriented to discharge substantially rearwardly into said plenum a secondary stream of said air from said intake airstream so that particles entering said intake duct with said air will tend to travel into said plenum with said secondary airstream and will be separated from said primary airstream, (e) duct means connected to said plenum and formed to guide a third stream of air from said plenum forwardly along a third path substantially separated by said duct means from said second path and then to discharge said third airstream smoothly into said primary airstream, (f) and means in said plenum for removing foreign particles from said plenum.

Other objects and advantages of the invention will appear from the following description, taken together with the accompanying drawings in which.

Figure 1:
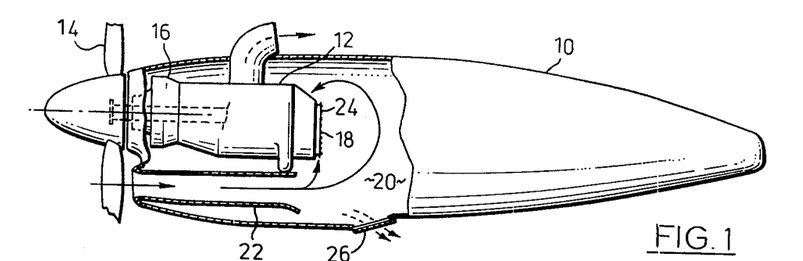
FIG. 1 is a side view, partly in section, of a prior art engine having a rear air inlet.

Reference is first made to FIG. 1, which shows a typical engine, nacelle and air intake system of the kind presently used in certain aircraft made by The de Havilland Aircraft of Canada, Limited. As shown, housed in the nacelle 10 is a gas turbine engine 12 which drives a propeller 14 through a gearbox 16. The engine 12 is mounted with its air inlet 18 located at the rear of the engine and opening radially into a large plenum 20. Air enters an intake duct 22, travels rearwardly, and then travels upwardly through a screen 24 into the engine 12. Because the engine inlet faces rewardly, foreign objects such as birds, sand and ice, which because of their momentum are unable to make the 180° turn into the engine air inlet, travel straight through and are bypassed out of the plenum 20 via a trapdoor 26. The system works well, but only a relatively few aircraft designs have a rearwardly facing engine which provides such particle separation.

Figure 2:
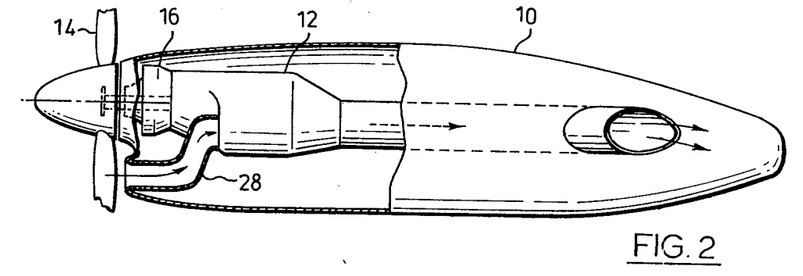
FIG. 2 is a side view, partly in section, showing a typical prior art engine without a particle separation system.

FIG. 2 shows a system used in many aircraft at the present time. The engine 12 faces forwardly and air for the engine enters an intake duct 28 and travels directly into the engine. There is no arrangement for removing foreign objects which are ingested, and any such foreign objects may damage the engine.

Figure 3:
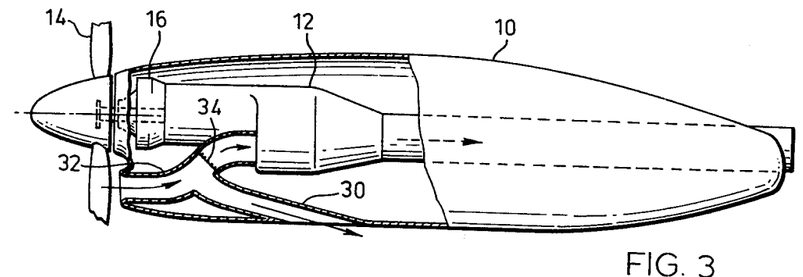
FIG. 3 is a side view, partly in section, showing an engine having a typical particle separation system of the kind currently proposed.

FIG. 3 shows a modification of the FIG. 2 arrangement of a kind which has been currently proposed for removing foreign objects and particles. In the FIG. 3 arrangement a bypass duct 30 branches off the main intake duct 32 and removes about 15% of the intake air as bypass air. A screen 34 in the main duct 32 just downstream of the bypass duct 30 prevents foreign objects from travelling into the engine. The screen 34 is formed from heavy metal rods.

The FIG. 3 arrangement has several serious disadvantages. Firstly, the screen 34, even though made of heavy material, must be shock mounted in order to withstand the impact of heavy objects such as birds. Secondly, because the screen 34 tends to ice, it must be electrically heated, thereby adding to the complexity and cost of the arrangement. Thirdly, each of the three ends of the intake duct arrangement must be shock mounted by means of a corrugated mounting, which adds weight and cost. Fourthly, when the engine is to be serviced, the nacelle must be removed and then the three branches of the intake duct must be separately removed, adding to the cost of servicing the engine. Finally, the loss of 15% of the intake air as bypass flow causes a reduction in the efficiency of the engine.

Figure 4:
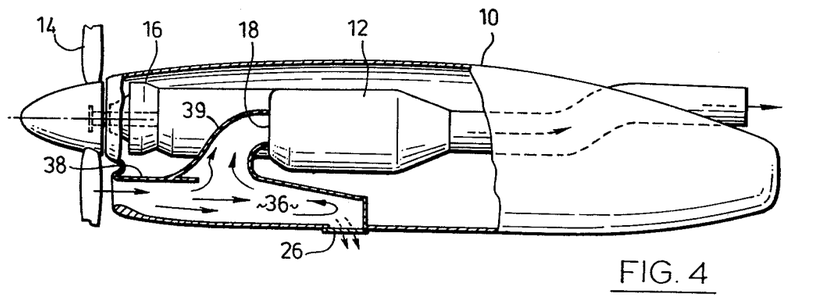
FIG. 4 is a side view, partly in section, of an engine showing a particle separation system of a kind which was a forerunner to the present invention.

An attempt was made by The de Havilland Aircraft of Canada, Limited to avoid the disadvantages of the FIG. 3 arrangement by adopting the FIG. 4 arrangement. In the FIG. 4 arrangement a large plenum 36 is provided at the rear of the intake duct 38 and into which the intake duct discharges. It was intended that the air entering the intake duct 38 would find its way upwardly from the plenum 36 through an upwardly directed branch duct 39 into the inlet 18 of the engine. Foreign objects and particles because of their momentum travel straight through into the rear of the plenum 36 for removal via the trapdoor 26.

When the FIG. 4 arrangement was tested, it was found that instabilities occurred and the entire arrangement began to vibrate. It is believed that the problem was that the air flowing upwardly into the branch duct 39 directly from the main intake duct 38 interferred with air which first travelled into the plenum 36 and then attempted to travel upwardly into the branch duct 39. In simplified terms it is believed that first one airstream would prevail and then the other, much like traffic in two streams at a set of traffic lights. The resultant vibration of the structure and turbulance in the air fed into the engine were extremely undesirable.

A preferred intake structure 40 according to the invention is shown in FIGS. 5 to 17 and has been found to operate in a highly satisfactory manner. The structure 40 will first be described generally with reference to FIGS. 5 and 9. As there shown, the intake structure 40 includes a main intake duct 42. An inlet airstream 44 enters duct 42 and is divided into a primary airstream 46 and a secondary airstream 48. The primary airstream 46 turns sharply upwardly and then travels directly into the engine inlet 50 and through the engine intake duct indicated in dotted lines at 51. The secondary airstream 48 travels directly rearwardly into a plenum 52 located behind duct 42. Birds, stones, ice and the like entering the main intake duct 42 simply travel straight through the plenum 52 as shown by arrows 56, and exit through a door 58 which is opened when required.

Figure 5:
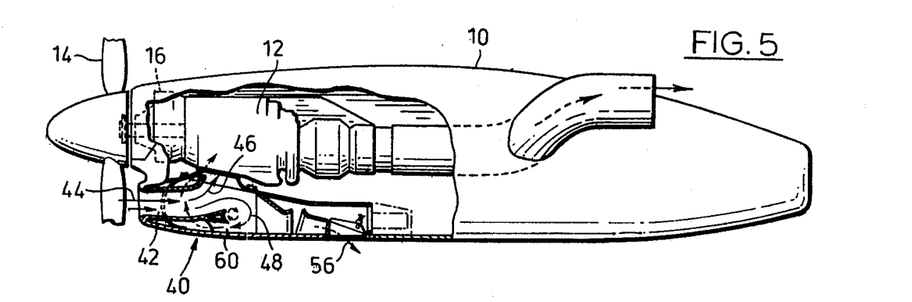
FIG. 5 is a side view, partly in section, of an engine having a particle separation air intake system according to the present invention.
Figure 9:
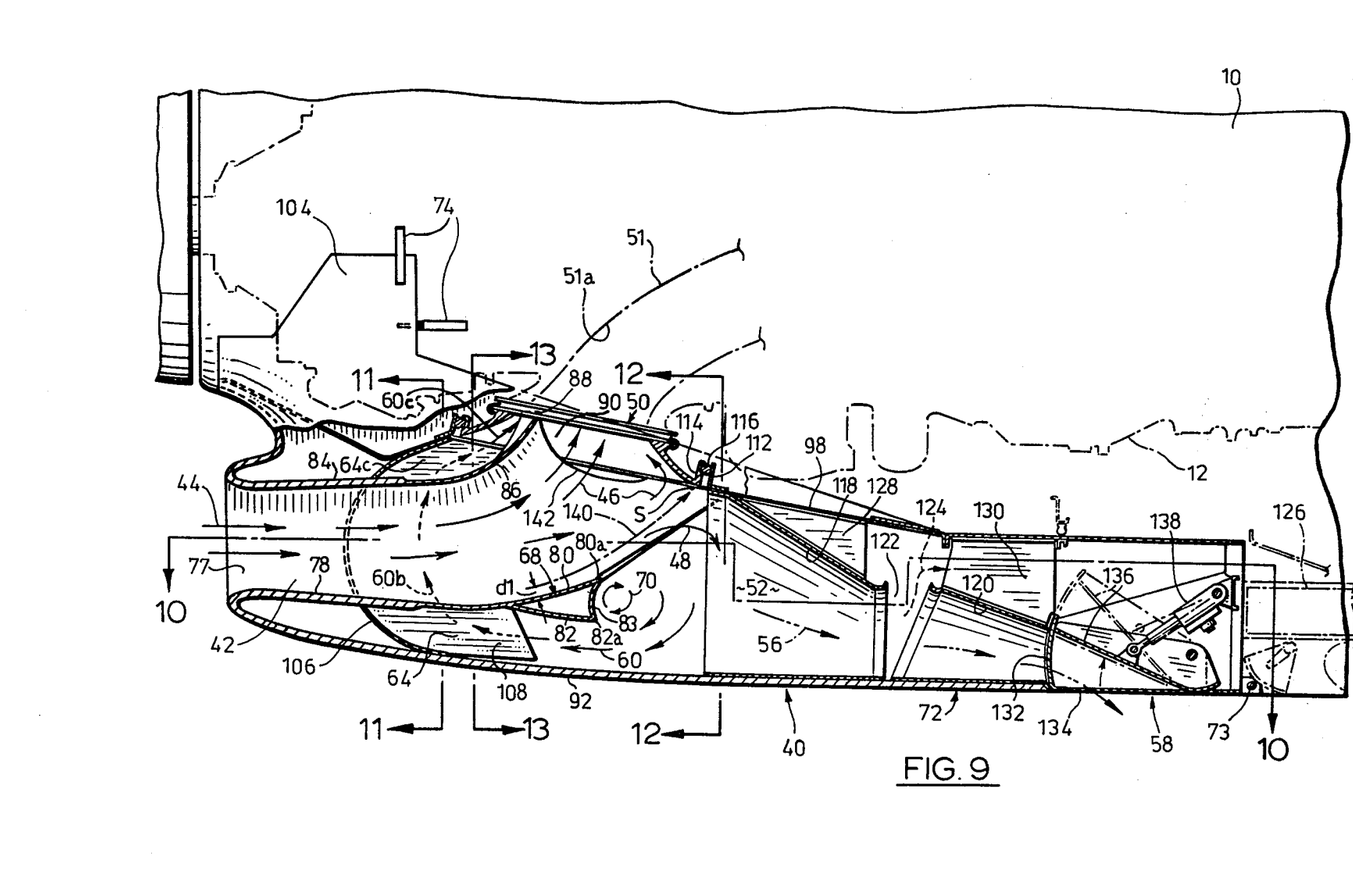
FIG. 9 is a sectional view along lines 9—9 of FIG. 6.
Figure 10:
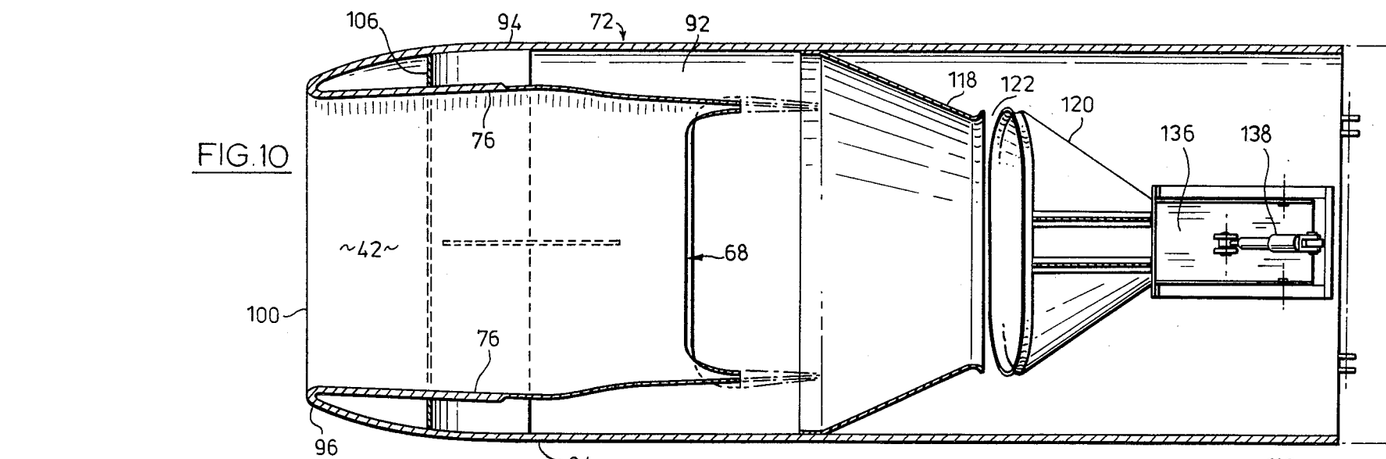
FIG. 10 is a plan view taken in section along lines 10—10 of FIG. 9.
Figure 11:
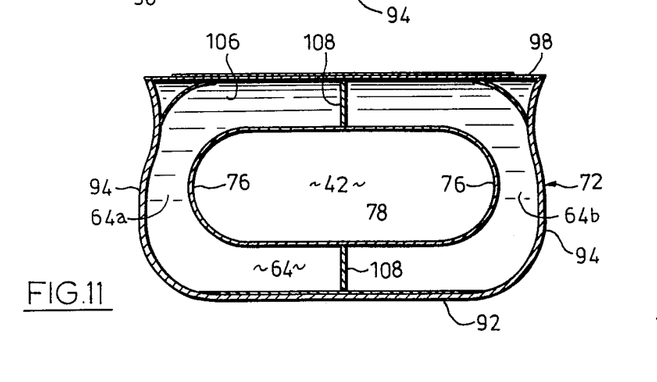
FIG. 11 is a sectional view along lines 11—11 of FIG. 9.

From the plenum 52, a third airstream 60 (which may be equal to the entire secondary airstream 48 if no other air is removed from the plenum 52) travels forwardly through an air duct 64 located below and to the sides of the main intake duct 42. When the third airstream 60 reaches the front end of the air duct 64, it divides into two streams 60a, 60b, one travelling upwardly on each side of the main air intake duct 42. The airstreams 60a, 60b rejoin as stream 60c at the top of the main air intake duct 42, and then travel rearwardly and upwardly through the peripheral gap formed by the engine inlet 50 and intake lip 86 (to be described), to rejoin the primary airstream 46 flowing into the engine inlet 50 and engine intake duct 51. (A portion of the third airstream also travels from the plenum 52 directly forwardly and upwardly at the sides of the intake duct 42 to rejoin the primary air stream, as will be described.)

The structure shown (and to be described in more detail) has a number of important features and advantages, which include the following:

1. The arrangement shown produces no significant instabilities. Instead of the third airstream 60 interfering with the primary airstream 46 as both attempt to travel into the engine, the third airstream 60 is guided forwardly and upwardly around the inlet duct and then fed into the primary airstream 46 in a path which is generally substantially parallel to that of the primary airstream 46, so that both join smoothly. The result is similar to a cloverleaf, rather than to the traffic light situation of FIG. 4.

2. The portion of the third airstream indicated by arrows 60c is located so that it permits the primary airstream 46 to jump to the wall 51a of the engine intake duct as the primary airstream travels upwardly into the engine, thus reducing turbulence and losses.

3. At the point where the primary and secondary airstreams separate, a cusp 68 is provided. The cusp 68 creates a sort of air roller bearing, indicated at 70 in FIG. 9. The rotating air roller bearing 70 helps to separate the secondary airstream 48 travelling rearwardly into the plenum 52 from the third airstream 60 travelling forwardly into the duct 64. This improves the flow stability and reduces friction losses.

4. Since the door 58 need only be opened at times when foreign objects have been collected or are expected, there are normally no secondary air losses since no secondary air is vented without first passing through the engine.

5. Since the entire air intake system can be mounted in a single housing which (as will be described) can be hinged downwardly away from the engine for access to the engine, servicing of the engine is greatly facilitated.

6. No blocking screens are required, thereby minimizing deicing and anti-icing problems.

It is found that the invention solves a problem which in the past had been thought to be almost impossible to solve, i.e. it permits bypass of foreign objects without complexity and without creating significant instabilities, icing problems or substantial losses.

Figure 8:
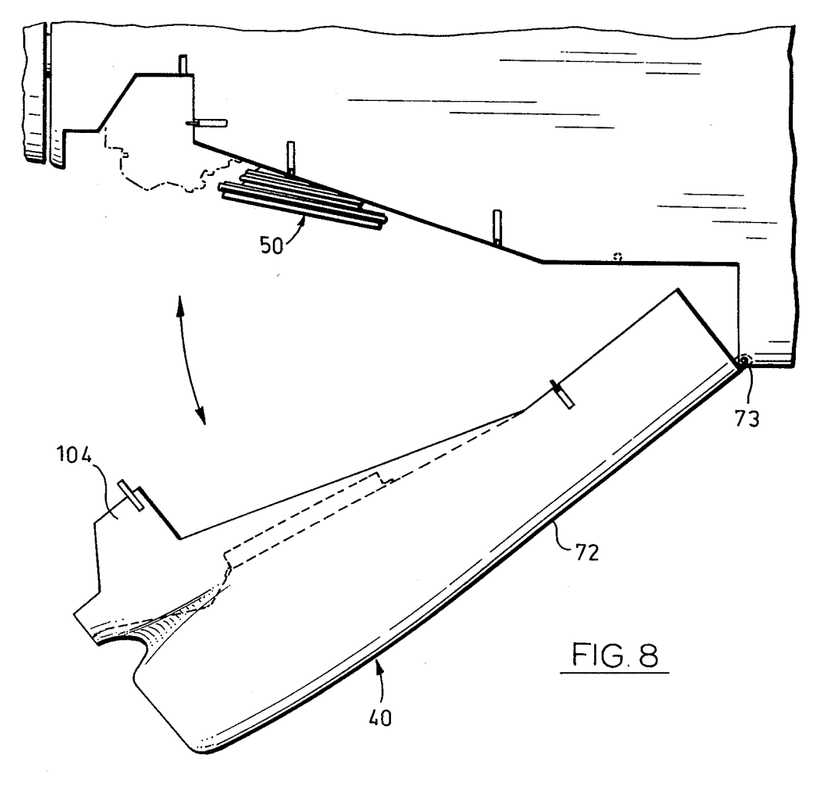
FIG. 8 is a view similar to that of FIG. 7 but showing the air intake system swung to an open position.

A more detailed description of the preferred embodiment of the invention is as follows. As best shown in FIGS. 6 to 9 inclusive, the intake structure 40 is formed as a unit in a housing 72 connected at its rear to the nacelle 10 by hinges 73. The intake structure 40 is normally held in closed position against the nacelle 10 by a set of latches 74 (FIG. 6) which are conventional in nature and therefore will not be described in detail. As indicated, the latches 74 can be released and the intake structure 40 swung downwardly as shown in FIG. 8 for engine servicing.

Figure 12:
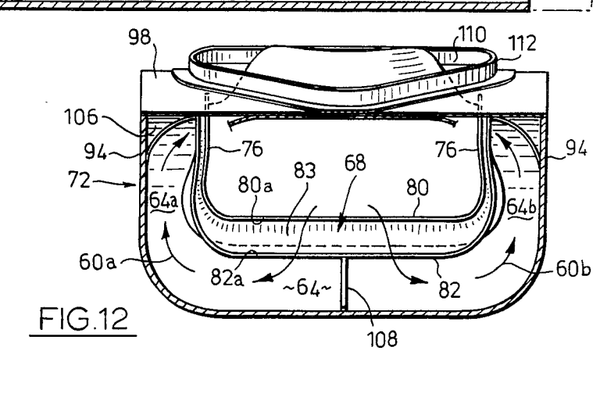
FIG. 12 is a sectional view along lines 12—12 of FIG. 9.
Figure 16:
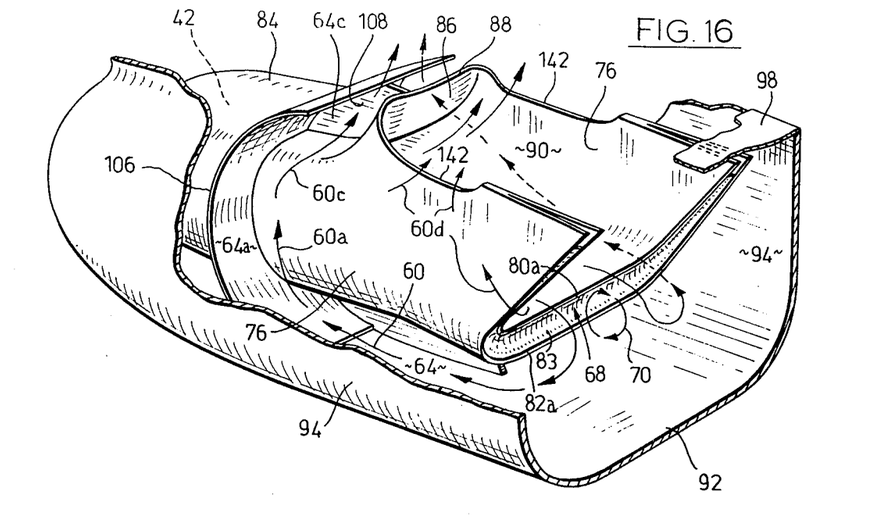
FIG. 16 is a partly broken away perspective view, taken from the rear and slightly above, of a portion of the intake system of FIG. 6.

The main intake duct 42 is centered laterally within the housing 72. The intake duct 42 is generally rectangular in cross-section, as shown in the drawings, but with rounded sides 76 and an inlet opening 77. The bottom wall 78 of the main intake duct 42 terminates in the cusp or V-shaped formation 68, which consists of an upwardly curved bottom wall portion 80 and a straight bottom wall portion 82. Both terminate at rear edges 80a, 82a located directly beneath the engine inlet 50, with a concave filler plate 83 extending therebetween. At its sides the V-shaped formation or cusp 69 extends upwardly to the upper wall 98 (to be described) of the housing, as shown in FIGS. 9, 12 and 16.

The top wall 84 of the main intake duct 42 slopes slightly upwardly rearwardly along the bulk of its length and then at its rear curves sharply upwardly at a curved portion 86, terminating just above the bottom of the engine inlet 50. The rear edge 88 of the curved portion 86 also forms the front edge of a top opening 90 (FIGS. 6, 9 and 16) from the main intake duct 42 into the engine inlet 50. The curved portion 86 extends above the opening 90 and into the inlet 50 to help guide the primary airstream 46 upwardly into the inlet 50.

The housing 72 includes a bottom wall 92, sidewalls 94, a front wall 96, and an upper wall 98. A front opening 100 for the main intake duct 42 is located in the front wall 84 of the housing.

Figure 6:
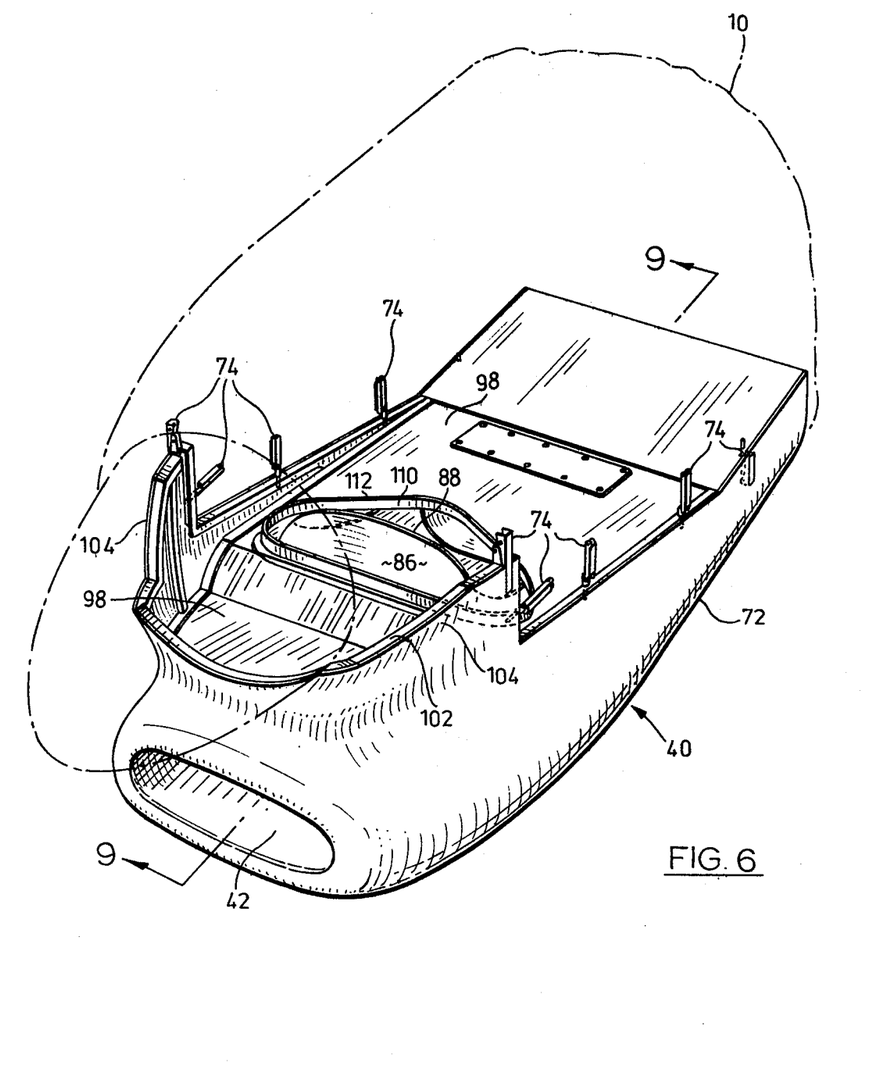
FIG. 6 is a perspective view, from the front and top, showing the air intake system of FIG. 5.
Figure 7:
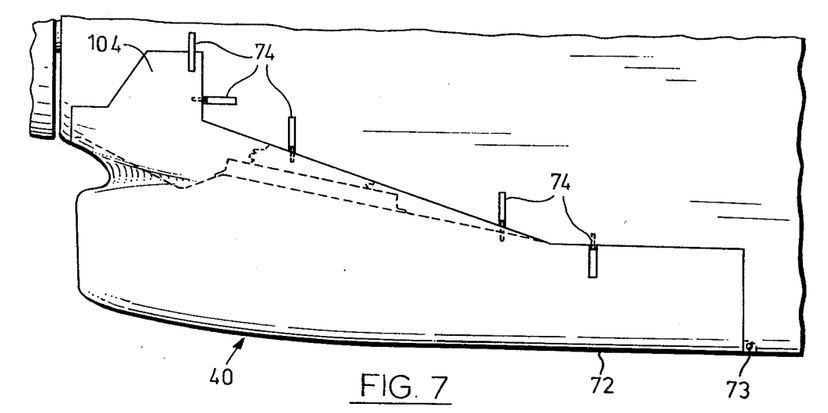
FIG. 7 is a side view showing the air intake system of FIG. 6 in closed position against the engine nacelle.

The housing sidewalls 94 extend above the housing upper wall 98 along the front part of the housing 78 and terminate in a formed rim 102 (FIG. 6). The rim 102 is shaped to fit the contour of the lower edge of the nacelle 10 and also to ensure that the entire housing 72 can be firmly secured to the nacelle. The shape of the rim 102 is also arranged to facilitate access to the front of the engine 12. For this purpose the housing sidewalls 94 each include an upwardly projecting portion 104 adjacent the front thereof, as best shown in FIGS. 6 to 8 and 14. The upwardly projecting sidewall portions 104 help to ensure that the housing 72 will not detach from the nacelle 10 in use and also, when the housing 72 is swung downwardly, expose the sides of the front of engine 12 for servicing.

The lower portion 64a of the air duct 64 is defined in part by the space between the bottom wall 78 of the main intake duct 42 and the bottom wall 92 of the housing 72. The side portions 64b of the air duct 64 are formed by the spaces between the sidewalls 76 of the main intake duct 42 and the sidewalls 94 of the housing 72. The front of the air duct 64 is defined by a curved plate 106, best shown in FIGS. 9 and 15, which extends from the housing bottom wall 92 upwardly to a position above the front part of the main intake duct top wall 84. The curved plate 106 has a hole 107 therein for the intake duct 42 to pass therethrough. The top portion 64c of the air duct 64 is defined by the space between the upper part of the curved plate 106 and the curved rear portion 86 of the top wall 84 of the main intake duct 42.

A longitudinally extending vertical divider plate 108 within the secondary air duct 54 divides the air duct 64 laterally into two equal parts to improve the stability of the third airstream 60 as it travels upwardly on each side of the main intake duct 42.

To reinforce the housing 72, its upper wall 98 extends from the front wall 96 over the curved plate 106, and is secured to the housing front wall 96, the curved plate 106, and the sidewalls 94. The upper wall 98 then extends rearwardly to the rear of the housing 72.

Figures 13, 14, 15:
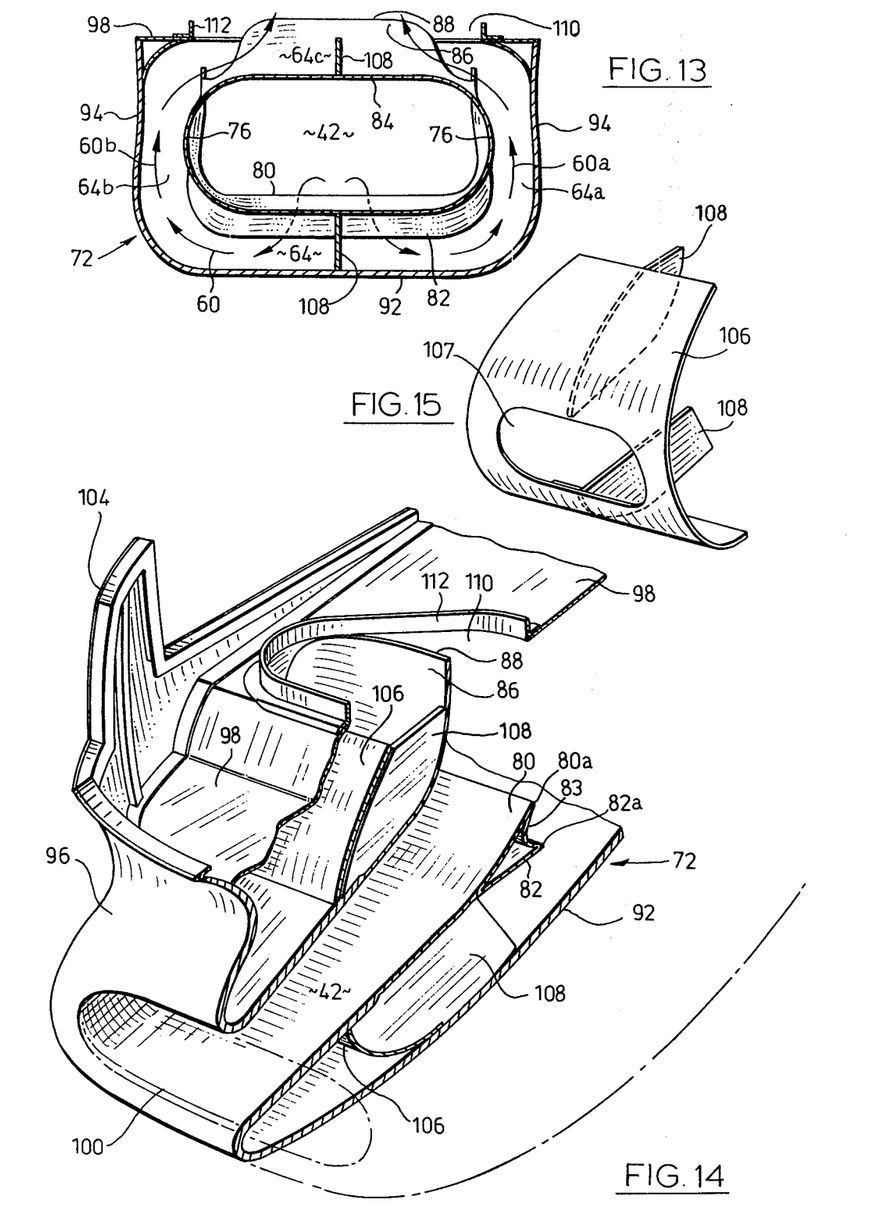
FIG. 13 is a sectional view along lines 13—13 of FIG. 9.
FIG. 14 is a perspective view, partly in section, of the front portion of the air intake system of FIG. 6.
FIG. 15 is a perspective view of guide and divider plates of the intake system of FIG. 6.

As shown in FIGS. 6 and 14, the upper wall 98 includes a generally heart shaped opening 110 bordered by an upstanding rim 112. The opening 110 is shaped to match the shape of a standard engine inlet 50. The inlet 50 includes a downwardly and outwardly flared rim 114 (FIG. 9) fitted with a conventional outwardly facing O-ring 116 against which the rim 112 seals when the housing 72 is swung to its closed position.

Figure 17:
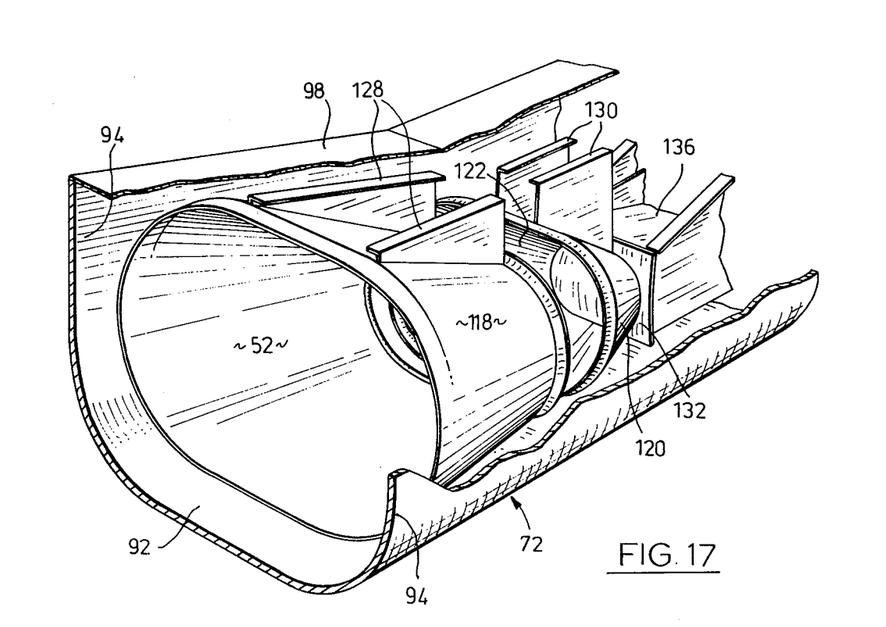
FIG. 17 is a partly broken away perspective view, taken from above and from the front, of the rear portion of the intake system of FIG. 6.

The plenum 52, in the rear portion of housing 72, is defined by two generally funnel-shaped structures 118, 120, best shown in FIGS. 9 and 17, which guide air (and particles) along a path of decreasing cross-sectional area toward the door 58. The funnel-shaped structures 118, 120 are separated by a space 122 which allows a fourth stream of air 124 (but not particles) travelling rearwardly through the funnel-shaped structures to travel upwardly and then rearwardly through the open rear end of the housing 72 and into an engine oil cooler 126 located behind the housing 72. This allows the intake structure 40 to perform dual duty, in that it provides particle free air both for the engine and also for the oil cooler of the engine.

The funnel-shaped structures 118, 120 are supported by flanges 128, 130 which extend from the tops of the structures 118, 120 to the upper wall 98 of the housing 72.

The door 58 includes a sector-shaped front surface 132, a flat lower surface 134 which is flush with the housing bottom wall 92 when the door is closed, and an upper surface 136 connected to a hydraulic actuator 138. When the door 58 is to be opened, the actuator 138 moves it to the dotted line position in FIG. 9, permitting particles and other objects to exit from the intake structure.

The operation of the system is as follows. As shown in FIG. 9, there is a stagnation point S just downstream of the engine inlet 50. Air which is directed toward the engine inlet 50 forwardly of the stagnation point S travels into the engine inlet as primary airstream 46. This is typically about 85% of the air entering main intake duct 42. Air directed toward the stagnation point S is indicated by arrow 140. Air flowing rearwardly of arrow 140 travels into the plenum 52 as the secondary airstream 48, together with the particles to be separated. Dimension d1 between arrow 140 and the lower wall 78 of the main intake duct is proportioned so that about 15% of the intake air is bled off as secondary air.

It will be noted that most dense particles entering the intake duct 42 will travel directly rearwardly into the plenum 52. The arrangement by which the third airstream 60c is fed into the engine inlet 50 forwardly of the wall 86 allows the curved wall 86 to be moved further rearwardly than would otherwise be possible, and this reduces the number of "line of sight" paths which a particle can follow to enter the engine inlet. Moreover the rearward movement of the curved wall 86 has been accomplished without incurring a substantial total pressure loss in the air fed to the engine. Although there is a "line of sight" between the inlet opening 77 and the engine inlet 50, the line is quite oblique, which reduces the likelihood of particles entering the entine inlet 50.

From the plenum 52, the third airstream 60 travels forwardly through the air duct 64 (including portions 64a, 64b thereof) beneath and to the sides of the main intake duct 42. The third airstream 60 is equal in flow to the secondary airstream 48 less the sum of any air flows travelling to the trapdoor 58, or to the oil cooler 126, or lost in leaks. The main portion of the third airstream 60 flows from lower duct 64 upwardly on each side of the main intake duct 42, and then rearwardly and upwardly through duct portion 64c, over curved portion 86 and into the engine inlet 50. As will be apparent from FIG. 16, a part 60d of the third airstream 60 may also tend to travel around the sides of the cusp 68, directly forwardly and upwardly over the sides of the main intake duct 42, and then over the side edges of the upper opening 90 in the main intake duct 42. To accommodate this flow, which also merges smoothly with the primary airstream, the upper side edges of opening 90 are cut back or notched as indicated at 142, from a location forwardly of the stagnation point S forwardly to blend in with the lip 88 forming a continuous flow gap between duct 42 and engine inlet 50. Rearwardly of notches 142 the upper side edges of duct 42 seal against the top surface 98 of the structure, as shown in FIG. 9. This prevents secondary air from feeding forwardly into the engine inlet 50 aft of the stagnation point 5 and causing flow separation.

The location of lip 88, which defines the dimension of the flow gap between the duct 42 and the engine inlet 50, is important. This lip, which guides the primary airstream 46, should be located so as to provide efficient turning of the primary airstream 46 into the engine inlet 50. Thus the lip 88 should not be too far from wall 51a. However, the spacing must be sufficient so as not to choke off the third airstream 60c. However, the spacing between lip 88 and wall 51a should be sufficiently small as not to create a larger third airstream than necessary, since it is desired to have most of the intake air travel directly into the engine inlet 50 which is the most efficient path.

It will also be noted that in the arrangement shown, the plenum 52 is pressurized, helping to produce a positive pressure on the convex side of the primary airstream 46 flowing through the main intake duct 42 into the engine inlet 50. This helps to deflect the primary airstream 46 into the engine inlet, although of course the main deflecting force consists of the suction produced by the engine. As mentioned, the main separation of the primary and secondary airstreams occurs at the stagnation point S which will vary in position with variation of the third airstream to primary airstream flow ratio.

The cusp 68, which produces an air roller bearing 70, separates the secondary and third airstreams from each other, and thus reduces losses in the system. Without such flow separation, buffeting between the forward and rearward flows tends to occur, and this creates not only losses but also undesired vibrations.

A further advantage of the system shown is that a simple boot de-icing system may be used, consisting simply of an expansible rubber boot (not shown) fitted around the opening 100 of the main air intake duct 42. Although ice will be broken from the boot and will be shed into the main air intake 42 during operation, the ice will travel rearwardly into the plenum 52 where it can be disposed of without entering the engine. A complex anti-icing system (consisting of heating structure to prevent the formation of ice on engine intake screens) is not normally required.

Although a specific arrangement of air passages has been shown, it will be appreciated that various changes may be made while still preserving the feature of turning the primary airstream sharply upwardly while permitting a secondary airstream containing objects therein to travel into a plenum, and then guiding a third airstream from the plenum forwardly, separated from the second airstream, to rejoin the main airstream in an efficient manner.

In addition, while the system has been shown located below an aircraft engine located in a nacelle, the air intake system of the invention can be differently oriented with respect to the engine, and can be used with engines in applications other than in aircraft but where dust or particles may present a problem.

I claim:

1. For use with an engine having an air inlet, a separator for removing foreign particles from the air entering said inlet, said separator comprising:
   (a) an air intake duct formed for an intake airstream to flow in a first substantially rearward path therein,
   (b) a plenum behind said intake duct,
   (c) said intake duct having guide means for separating from said intake airstream a primary airstream and for guiding said primary airstream in a second path at a substantial angle to said first path for passage into said engine inlet,
   (d) said intake duct being oriented to discharge substantially rearwardly into said plenum a secondary stream of said air from said intake airstream so that particles entering said intake duct with said air will tend to travel into said plenum with said secondary airstream and will be separated from said primary airstream,
   (e) duct means connected to said plenum and formed to guide a third stream of air from said plenum forwardly along a third path substantially separated by said duct means from said second path and then to discharge said third airstream smoothly into said primary airstream,
   (f) and means in said plenum for removing foreign particles from said plenum.

2. Apparatus according to claim 1 and including means for conducting from said plenum a fourth airstream along a path at a substantial angle to said first path, said fourth airstream being adapted for use with an oil cooler.

3. Apparatus according to claim 1 wherein said separator includes a housing for said intake duct, plenum and duct means, said housing including hinge means adapted to be connected to said engine for swinging of said housing between a closed position in which said guide means and duct means may deliver said primary and third airstreams into said engine inlet and an open position in which said engine is accessible for service.

4. Apparatus according to claim 1 wherein said separator includes a housing for said intake duct, plenum and duct means, said housing including hinge means adapted to be connected to said engine for swinging of said housing between a closed position in which said guide means and duct means may deliver said primary and third airstreams into said engine inlet and an open position in which said engine is accessible for service and wherein said intake duct includes a lower rear edge formed substantially in the shape of a cusp, said cusp acting as a flow separator to facilitate separation of said secondary airstream flowing rearwardly into said plenum from said third airstream flowing forwardly beneath said intake duct.

5. Apparatus according to claim 1 wherein said duct means defines a passage for said third airstream extending forwardly beneath said intake duct and then upwardly beside said intake duct.

6. Apparatus according to claim 5 wherein said passage defined by said duct means extends forwardly beside as well as beneath said intake duct.

7. Apparatus according to claim 2 wherein said passage defined by said duct means extends forwardly beside as well as beneath said intake duct and wherein said intake duct includes a lower rear edge amd side rear edges all formed substantially in the shape of a cusp, said cusp acting as a flow separator to facilitate separation of said secondary airstream flowing rearwardly into said plenum from said third airstream flowing forwardly beneath and to the sides of said intake duct.

8. Apparatus according to claim 5 wherein said intake duct includes a lower rear edge formed substantially in the shape of a cusp, said cusp acting as a flow separator to facilitate separation of said secondary airstream flowing rearwardly into said plenum from said third airstream flowing forwardly beneath said intake duct.

9. Apparatus according to claim 1 wherein said duct means defines a passage for said third airstream extending forwardly beneath said intake duct, then upwardly beside said intake duct, and then rearwardly above said intake duct.

10. Apparatus according to claim 9 wherein said portion of said passage extending rearwardly over said intake duct is of decreasing cross-section in a rearward direction, said portion of said passage terminating adjacent said guide means and discharging said third airstream into said primary airstream over said guide means.

11. In an aircraft, a nacelle having an engine therein, said engine having an air inlet, and a separator for removing foreign particles from the air entering said inlet, said separator comprising:
 (a) a housing having front, side and bottom walls,
 (b) means connecting said housing to said nacelle,
 (c) an air intake duct in said housing and extending rearwardly from said front wall, said intake duct having bottom, side and top walls and being formed for an intake airstream to flow in a first substantially rearward path therein,
 (d) said bottom wall of said intake duct being spaced from the bottom wall of said housing and said sidewalls of said intake duct being spaced from said sidewalls of said housing,
 (e) said top wall of said intake duct having an upwardly curved rear portion extending to said engine inlet and an upper opening behind said rear portion, for separating from said intake airstream a primary airstream and for guiding said primary airstream along a second upwardly sloping path at a substantial angle to said first path through said opening and into said engine inlet,
 (f) said housing having a plenum therein behind said intake duct,
 (g) said intake duct being oriented to discharge substantially rearwardly into said plenum a secondary stream of said air from said intake airstream and separated from said primary airstream so that particles entering said intake duct with said air will tend to travel into said plenum with said secondary airstream and will be separated from said primary airstream,
 (h) duct means connected to said plenum, said duct means having a first duct portion extending forwardly from said plenum and comprising the space between said bottom wall of said intake duct and the bottom wall of said housing, a second duct portion communicating with said first duct portion and extending upwardly and comprising the spaces between each sidewall of said intake duct and the respective sidewalls of said housing, and a third duct portion communicating with said second duct portion and extending rearwardly and upwardly over said rear portion of said top wall of said intake duct and to said engine inlet, for a third stream of air to flow from said plenum through said duct means and to be discharged into said engine inlet,
 (i) and door means in said plenum for removing foreign particles from said plenum.

12. Apparatus according to claim 11 wherein said bottom wall of said intake duct includes a lower rear edge beneath said engine inlet and formed substantially in the shape of a cusp, said cusp acting as a flow separator to facilitate separation of said secondary airstream flowing rearwardly into said plenum from said third airstreaam flowing forwardly beneath said intake duct.

13. Apparatus according to claim 11 wherein said second duct portion also communicates between said plenum and said engine inlet for guiding a portion of said third airstream directly forwardly and upwardly from said plenum into said engine inlet.

14. Apparatus according to claim 11 wherein said bottom wall and side walls of said intake duct include a lower rear edge beneath said engine inlet and rear side edges, said lower rear edge and rear side edges all being formed substantially in the shape of a cusp, said cusp acting as a flow separator to facilitate separation of said secondary airstream flowing rearwardly into said plenum from said third airstream flowing forwardly beneath and to the sides of said intake duct.

15. Apparatus according to claim 11 wherein including means for conducting from said plenum a fourth airstream along a path at a substantial angle to said first path, and means for directing said fourth airstream to an engine oil cooler.

16. Apparatus according to claim 11 wherein said means connecting said housing to said nacelle includes hinge means at the rear of said housing for swinging said housing between a closed position in which said guide means and said duct means conduct air into said engine inlet, and an open position in which said housing is swung downwardly from said engine so that said engine is accessible for service, and latch means for securing said housing in closed position.

17. Apparatus according to claim 11 wherein said means connecting said housing to said nacelle includes hinge means at the rear of said housing for swinging said housing between a closed position in which said guide means and said duct means conduct air into said engine inlet, and an open position in which said housing is swung downwardly from said engine so that said engine is accessible for service, and latch means for securing said housing in closed position, and said sidewalls of said housing include upwardly projecting portions adjacent the front of said housing to provide access to the sides of said engine adjacent the front of said engine.

18. Apparatus according to claim 11 wherein said plenum has an upper wall, said upper opening being defined by said upwardly curved rear portion and by upper side edges of said intake duct, said upper side edges being sealed against said upper wall of said plenum adjacent the rear of said upper side edges to prevent said secondary airstream in said plenum from travelling forwardly and upwardly into said opening.

19. Apparatus according to claim 11 and including a curved plate in said housing adjacent the front thereof, said curved plate having an opening therein for said intake duct to extend therethrough, said curved plate defining a front wall for said second duct portion and defining a top wall for said third duct portion.

20. Apparatus according to claim 19 wherein said third duct portion is of decreasing cross-section in a rearward direction.

* * * * *